US010172447B2

(12) United States Patent
Graham

(10) Patent No.: US 10,172,447 B2
(45) Date of Patent: Jan. 8, 2019

(54) ADJUSTABLE HEIGHT DESKTOP WORKSTATION

(71) Applicant: Josh Graham, Vancouver, WA (US)

(72) Inventor: Josh Graham, Vancouver, WA (US)

(73) Assignee: Joshua David Graham, Vancouver, WA (US)

( * ) Notice: Subject to any disclaimer, the term of this patent is extended or adjusted under 35 U.S.C. 154(b) by 0 days.

(21) Appl. No.: 15/062,631

(22) Filed: Mar. 7, 2016

(65) Prior Publication Data
US 2017/0251805 A1 Sep. 7, 2017

(51) Int. Cl.
A47B 9/16 (2006.01)
A47B 21/02 (2006.01)
B66F 7/06 (2006.01)
F16M 11/00 (2006.01)

(52) U.S. Cl.
CPC ............... *A47B 9/16* (2013.01); *A47B 21/02* (2013.01); *B66F 7/0633* (2013.01); *F16M 11/00* (2013.01); *A47B 2200/0041* (2013.01)

(58) Field of Classification Search
CPC .......... A47B 9/16; B66F 7/065; B66F 7/0666; B66F 7/0683; B60N 2/508
USPC ....... 108/145, 147; 254/122; 248/421, 277.1
See application file for complete search history.

(56) References Cited

U.S. PATENT DOCUMENTS

| 2,894,562 | A | * | 7/1959 | Peller | A61G 15/02 248/421 |
| 5,953,776 | A | * | 9/1999 | Sanders | A61B 6/0457 108/145 |
| 6,038,986 | A | * | 3/2000 | Ransil | A47B 9/02 108/145 |
| 6,155,642 | A | * | 12/2000 | Kawakami | A47C 1/06 248/421 |
| 6,405,997 | B1 | * | 6/2002 | Granata | B66F 7/0666 254/122 |
| 7,222,832 | B2 | * | 5/2007 | Welker | A47C 3/38 248/157 |
| 8,132,518 | B2 | * | 3/2012 | Kim | B66F 7/0633 108/145 |
| 9,199,297 | B2 | * | 12/2015 | Muller | B21D 43/055 |
| 2003/0154890 | A1 | * | 8/2003 | Warner | A47B 9/00 108/145 |
| 2007/0266912 | A1 | * | 11/2007 | Swain | A47B 9/02 108/145 |
| 2015/0289641 | A1 | * | 10/2015 | Ergun | A47B 9/16 108/42 |
| 2017/0049224 | A1 | * | 2/2017 | Kim | A47B 21/02 |

* cited by examiner

Primary Examiner — Jose V Chen
(74) Attorney, Agent, or Firm — Microsoft

(57) ABSTRACT

An adjustable height platform is disclosed. The example adjustable height platform provides a first stage of uprights coupled to a lower platform and a second stage of uprights coupled to a lower platform. The first and second stage are coupled by a bracket with three pivot points. A first lower upright and a first upper upright couple to distinct pivot points on the bracket and a second lower upright and second upper upright couple to a common pivot point on the bracket. A first-to-second stage transfer mechanism transfer rotation force from the first stage of uprights to the second stage of uprights. The upper platform includes a height fixing mechanism release to interface with a height fixing mechanism coupled to the first upper upright to fix the height of the adjustable height platform.

13 Claims, 4 Drawing Sheets

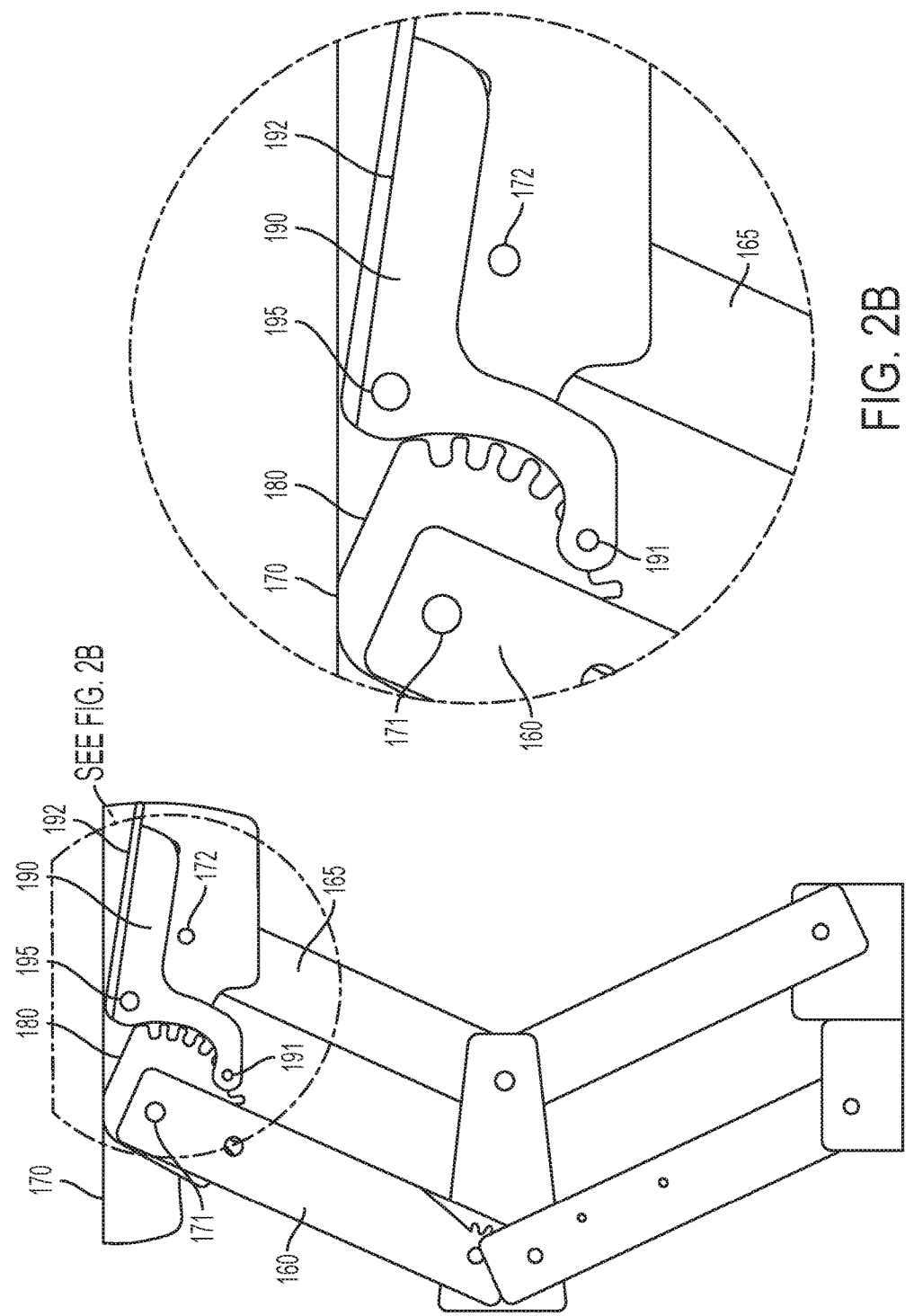

ADJUSTABLE HEIGHT DESKTOP WORKSTATION

BACKGROUND

In recent years, desk-bound workers have found it uncomfortable to sit for extended periods. One solution for this problem is known as the "standing height desk" in which a mechanism raises the work surface from a seated position to a standing position, allowing the worker to easily transition from working sitting down to working standing upright.

Many industries make use of adjustable height platforms. For example, the automobile industry uses adjustable height platforms to lift vehicles off the ground to access the underside of the vehicle. Heavy industry may attach wheels to the underside of an adjustable height platform and use the resulting rolling adjustable height platform to lift materials from one elevation to another, or to allow workers to access elevated working positions.

SUMMARY

Embodiments of the invention include an adjustable height monitor platform that may be placed on an existing desktop. The adjustable height monitor platform folds into a flat orientation when closed and when extended is able to be locked into a particular height. The adjustable height monitor platform includes a bracket disposed between the upper and lower supports to facilitate easy opening of the platform when in a flat orientation and includes a mechanism to translate the force of motion of the bottom uprights to the top uprights. The orientation of the interconnecting uprights facilitates extension of the platform from fixed pivot points on the top and bottom platforms.

DESCRIPTION OF THE DRAWINGS

The specific features, aspects, and advantages of the disclosure will become better understood with regard to the following description, appended claims, and accompanying drawings where:

FIGS. 2a and 2b are diagrams of an example height fixing mechanism and example height fixing mechanism release in accordance with an embodiment of the invention.

DETAILED DESCRIPTION

In the following description of adjustable height platforms, reference is made to the accompanying drawings, which form a part thereof, and which show by way of illustration examples by which implementations described herein may be practiced. It is to be understood that other embodiments may be utilized and structural changes may be made without departing from the scope of the claimed subject matter.

Figure 1A:
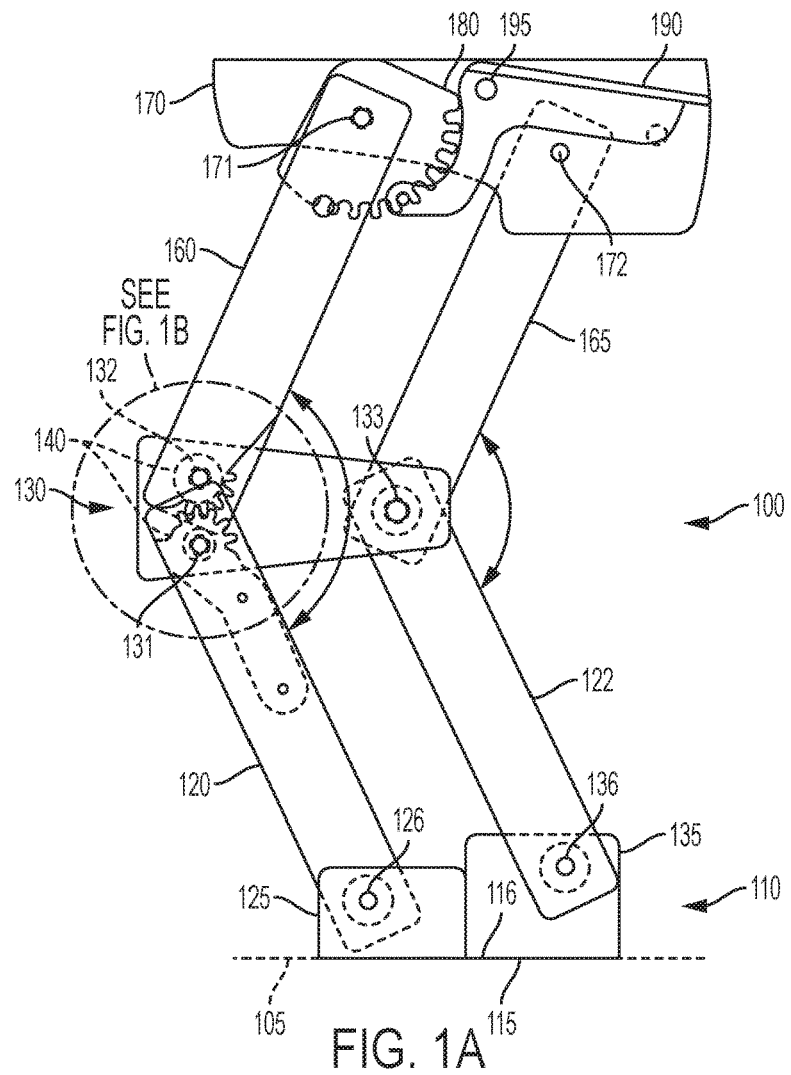
FIG. 1a is side view diagram of an example adjustable height mechanism in accordance with an embodiment of the invention.

FIG. 1a is side view diagram of an adjustable height mechanism 100 that preferably includes a lower platform 110, a first lower upright bar 120 and a second lower upright bar 122, a connecting bracket 130, a first-to-second stage force transfer 140, a first upper upright bar 160 and a second upper upright bar 165, an upper platform 170, and a height fixing mechanism 180 and a height fixing mechanism release 190.

The lower platform 110 contacts the surface 105 from which the upper platform 170 is to be separated, and lower platform 110 is preferably comprised of a bottomside lower bracket surface 115 with both a first lower bracket 125 and a second lower bracket 135 coupled to a topside lower bracket surface 116. It is to be appreciated that the bottomside lower bracket surface 115 can be configured in any manner to facilitate contact with the surface 105 from which the upper platform 170 is to be separated. In other examples, the bottomside lower bracket surface 115 contacts a curved surface, and the bottomside lower bracket surface 115 is a curved surface with a complementary curve allowing it to mate flush with the surface 105 and provide stability. It is understood that the bottomside lower bracket surface 115 is adapted to mate and provide stability to the adjustable height mechanism 100 without limitation. In another example, the bottomside lower bracket surface 115 has a form of locomotion, such as wheels or casters, attached to allow the adjustable height mechanism 100 to move from one location to another.

The first lower bracket 125 includes a first mounting pivot 126 to couple the first lower upright bar 120 to first bracket 125. The first mounting pivot 126 allows for the first lower upright bar 120 to pivot freely about an axis at the center of the first mounting pivot 126. The second lower bracket 135 includes a second moving pivot 136 to couple the second lower upright bar 122 to second bracket 135. The second mounting pivot 136 allows for the second lower upright bar 122 to pivot freely about the axis at the center of the second mounting pivot 136. The distance at which both the first mounting pivot 126 and second mounting pivot 136 are offset from the surface above 116 can be any distance in accordance with the present invention, and do not need to be the same distance.

The connecting bracket 130 includes a first bracket mounting pivot 131, a second bracket mounting pivot 132, and a third bracket mounting pivot 133. The first lower upright bar 120 is coupled to the connecting bracket 130 by first bracket mounting pivot 131. The first bracket mounting pivot 131 allows the first lower upright bar 120 to pivot freely about the axis at the center of the first bracket mounting pivot 131. The first upper upright bar 160 is coupled to the connecting bracket 130 by the second bracket mounting pivot 132. The second bracket mounting pivot 132 allows the first upper upright bar 160 to pivot freely about the axis at the center of the second bracket mounting pivot 132.

The second lower upright bar 122 and the second upper upright bar 165 are both coupled to the connecting bracket 130 by third bracket mounting pivot 133. The third bracket mounting pivot 133 allows each of the second lower upright bar 122 and the second upper upright bar 165 to pivot freely about the axis at the center of the third bracket mounting pivot 133.

The shape of the connecting bracket 130 is preferably designed to be contained within the height of the second bracket 135 to allow the adjustable height mechanism 100 to achieve a minimum possible height when in a folded position. The adjustable height mechanism 100 can advantageously be folded to a minimal height, thereby providing easy transport, compact storage, and reduced desktop surface bulk. This will be discussed further with respect to FIG. 4.

The connecting bracket 130 includes a first-to-second stage force transfer 140 that will be discussed with respect to FIG. 1b.

The upper platform 170 includes a first upper mounting pivot 171 and a second upper mounting pivot 172. While it is shown that the first upper mounting pivot 171 and the second mounting pivot 172 are integrated into the upper platform 170, first upper mounting pivot 171 and second mounting pivot 172 may each be included in a bracket that is further attached by a fastener such as a screw or bolt to upper platform 170. First upper upright bar 160 is coupled to the upper platform 170 by the first upper mounting pivot 171. First upper upright bar 160 pivots freely about the axis at the center of the first upper mounting pivot 171. Second upper upright bar 165 is coupled to the upper platform 170 by the second upper mounting pivot 172. Second upper upright bar 165 pivots freely about the axis at the center of the second upper mounting pivot 172.

The first upper upright bar 160 includes the height fixing mechanism 180. The height fixing mechanism release 190 is coupled to the upper platform 170 by the height fixing mechanism release mounting pivot 195. The height fixing mechanism release mounting pivot 195 allows the height fixing mechanism release 190 to pivot freely about the axis at the center of the height fixing mechanism release mounting pivot 195. The height fixing mechanism 180 is preferably a first series of protrusions to which a second series of protrusions included in height fixing mechanism release 190 are mated to hold the upper platform 170 in a fixed position relative to the first upper upright bar 160.

Figure 1B:
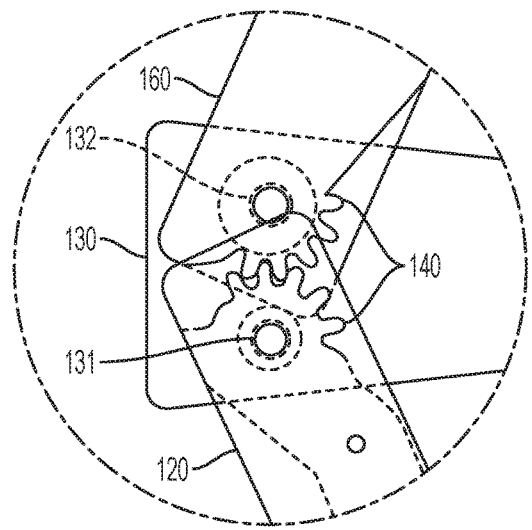
FIG. 1b is a close-up diagram of an example adjustable height mechanism with a first-to-second stage force transfer to transfer the force of motion from the bottom uprights to the top uprights in accordance with an embodiment of the invention.

FIG. 1b is a close-up diagram of the adjustable height mechanism 100 showing further detail of the first-to-second stage force transfer 140 to transfer the force of motion from first lower upright bar 120 to first upper upright bar 160. The first-to-second stage force transfer 140 is preferably a set of interlocking gears such that as one set of gears turn, the force of motion is transferred to the second set of gears. The coupling of the first lower upright bar 120 to the connecting bracket 130 by the first bracket mounting pivot 131 and the corresponding coupling of the first upper upright bar 160 to the connecting bracket 130 by the second bracket mounting pivot 132 provides for all of the rotational force disposed around the axis of the first bracket mounting pivot 131 to be applied rotationally to the axis of the second bracket mounting pivot 132.

More particularly, because first bracket mounting pivot 131 and second bracket mounting pivot 132 are fixed points relative to connecting bracket 130, no force of motion is applied to moving the normal position of either the first bracket mounting pivot 131 or the normal position of the second bracket mounting pivot 132. Therefore, due to the conservation of energy, all rotational force is transferred from the motion of the first lower upper upright bar 120 as it rotates around the axis at the center of the first bracket mounting pivot 131 and causes the first upper upright bar 160 to rotate about the axis at the center of the second bracket mounting pivot 132.

It is to be appreciated that the transference of rotational force provided by the first-to-second stage force transfer 140 also provides that a portion of this rotational force will also be applied to the second upper upright bar 165 and cause the second upper upright bar 165 to rotate about the axis at the center of the third bracket mounting pivot 133. This is due to the remainder of the rotational force applied to the first upper upright bar 160 by the second bracket mounting pivot 132 being further applied to the upper right platform 170 by the first upper mounting pivot 171. This causes a vertical force to be applied at the second upper mounting pivot 172 that correspondingly "pulls up" the third bracket mounting pivot 133 by creating a normal rotational force at the third bracket mounting pivot 133.

It is to be appreciated that any existing mechanism to allow the transfer of rotational force from one pivot axis to a second pivot axis can be substituted without limitation. For example, first-to-second stage force transfer 140 could be composed of a set of rubber rollers with a large contact area to create a maximum amount of friction, a pantograph-type mechanism, or the like.

In order to facilitate easy vertical movement of the upper platform 170 relative to the lower platform 110, the first lower upright bar 120 and the first upper upright bar 160 do not share a common pivot point on the connecting bracket 130. Preferably, but not necessarily, the first lower upright bar 120 is coupled to the connecting bracket 130 by first bracket mounting pivot 131. Preferably, but not necessarily, the first upper upright bar 140 is coupled to the connecting bracket 130 by the second bracket mounting pivot 132.

Preferably, the vertical offset of any relative place on the first lower mounting pivot 126 is approximately equivalent to half of the vertical distance separating a same relative place on the first bracket mounting pivot 131 and a same relative place on the second bracket mounting pivot 132. Correspondingly, the vertical offset of any relative place on the first upper mounting pivot 171 is approximately equivalent to half of the vertical distance separating a same relative place on the first bracket mounting pivot 131 and a same relative place on the second bracket mounting pivot 132.

By offsetting the vertical distance of both first bracket mounting pivot 131 and second bracket mounting pivot 132 and reflecting approximately half of this vertical distance in the vertical offset of first lower mounting pivot 126 and half of this vertical distance in the vertical offset of first upper mounting pivot 171, the adjustable height mechanism 100 is "primed", or, the bias for motion in the mechanism defaults to the desired direction. In this example, the desired bias for motion is an upward direction.

It is also to be appreciated that a motor or actuator can be disposed between the lower platform 110 and the first lower upright bar 120 or the second lower upright bar 122. Such a motor or actuator provides an upwards force to move the adjustable height mechanism 100 into an extended position. Furthermore, a damping mechanism can also be disposed between the lower platform 110 and the first lower upright bar 120 or the second lower upright bar 122 to absorb the energy as the upper platform descends due to gravity.

FIGS. 2a and 2b are close-up diagrams of the height fixing mechanism 180 and height fixing mechanism release 190. As discussed earlier, the first upper upright bar 160 includes the height fixing mechanism 180. The height fixing mechanism release 190 is coupled to the upper platform 170 by the height fixing mechanism release mounting pivot 195. The height fixing mechanism release mounting pivot 195 allows the height fixing mechanism release 190 to pivot freely about the axis at the center of the height fixing mechanism release mounting pivot 195. The height fixing mechanism 180 and the height fixing mechanism release 190 are preferably a ratchet and pinion mechanism. Preferably, the height fixing mechanism 180 is comprised of a ratchet and the height fixing mechanism release 190 is comprised of a pinion. When the pinion of the height fixing mechanism release 190 is engaged in the ratchet of the height fixing mechanism 180, the upper platform 170 is supported and held fixed at that height.

The height fixing mechanism release 190 includes a height fixing mechanism release bracket 192. The height fixing mechanism release bracket 192 provides a normal surface upon which a force is applied to cause the height fixing mechanism release bracket 192 to rotate about the axis at the center of the height fixing mechanism release mounting pivot 195 and disengage a second protrusion 191 that is included in the height fixing mechanism release 190.

The height fixing mechanism release 190 and the height fixing mechanism 180 may be disposed as separate elements or as a single element. It is to be appreciated that any type of mechanical construct to allow for the holding of the position of first upper upright bar 160 relative to the position of the upper platform 170 may be used. Any mechanisms that can hold the position of one moving connector fixed relative to a fixed surface may be substituted without limitation. For example, the height fixing mechanism 180 may be comprised of a solid high friction rubber wheel and the height fixing mechanism release may include a high friction brake pad that, when applied to the high friction rubber wheel, prevents the high friction rubber wheel from rotating. In another example, the height fixing mechanism 180 may have a number of holes drilled at intervals, and the height fixing mechanism release 190 may include a retractable pin that moves in to a hole to hold the upper platform 170 and moves out to allow repositioning of the upper platform 170.

Figure 3:
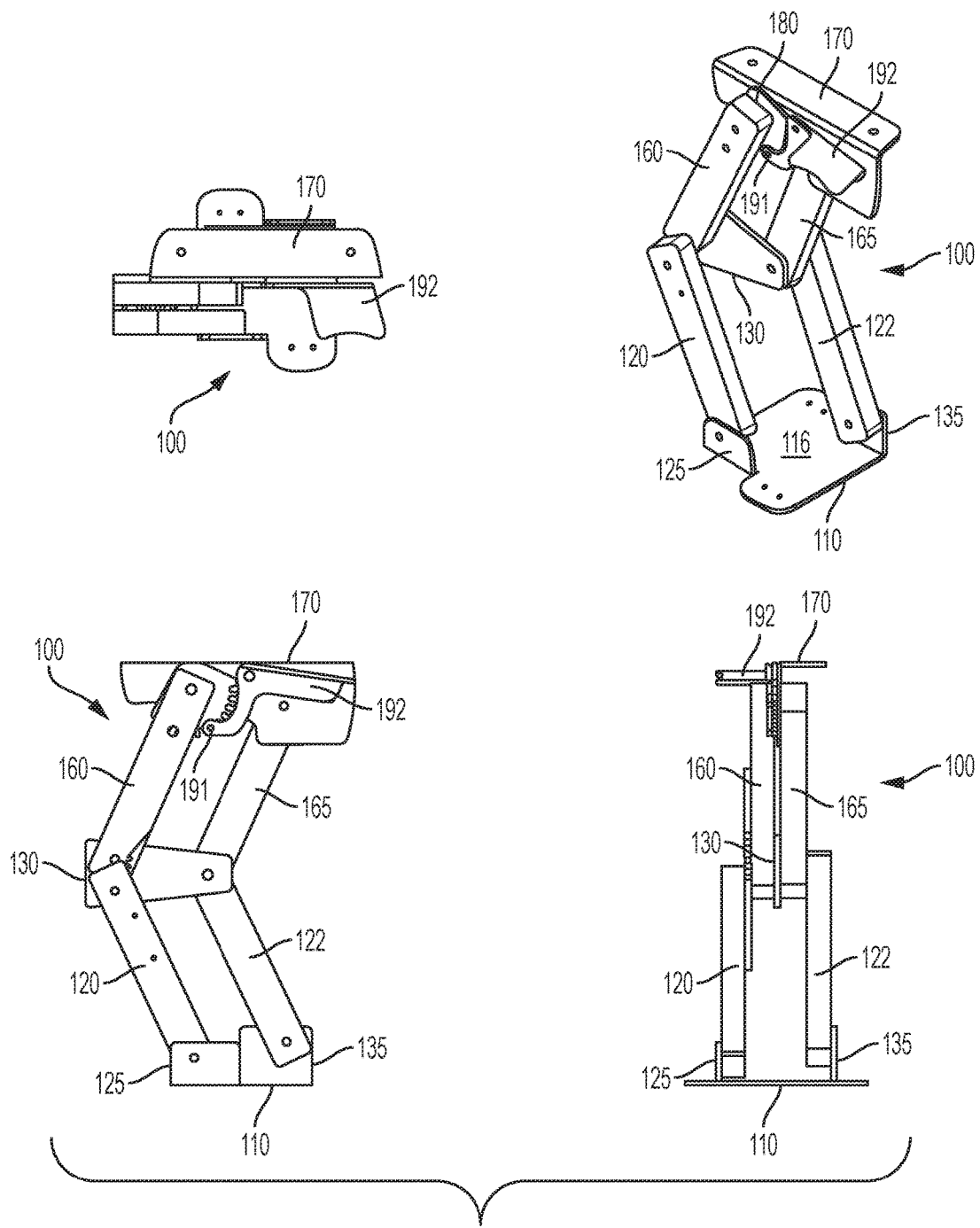
FIG. 3 is a diagram of multiple angles of an exemplary mechanism at an example extension in accordance with an embodiment of the invention.

FIG. 3 is a diagram of multiple angles of the adjustable height mechanism 100 at an example extension, including a top view, an angled view, a side view, and a back view. The first lower bracket 125 and the second lower bracket 135 are separated by a fixed distance on the lower platform 110. The distance between the first lower bracket 125 and the second lower bracket 135 is preferably set to accommodate the aggregate widths of the first lower upright bar 120, the first upper upright bar 160, the connecting bracket 130, the height fixing mechanism 180, the height fixing mechanism release 190, the bracket of the upper platform 170, the second upper upright bar 165, and the second lower upright bar 122.

However, it is to be appreciated that the distance between the first lower bracket 125 and the second lower bracket 135 may be separated by any distance and each of the first upright bar 120, the first upper upright bar 160 the connecting bracket 130, the height fixing mechanism 180, the height fixing mechanism release 190, the bracket of the upper platform 170, the second upper upright bar, the second lower upright bar 122, and any other elements either integral or non-integral to the functioning of the adjustable height mechanism may be disposed in any order.

Figure 4:
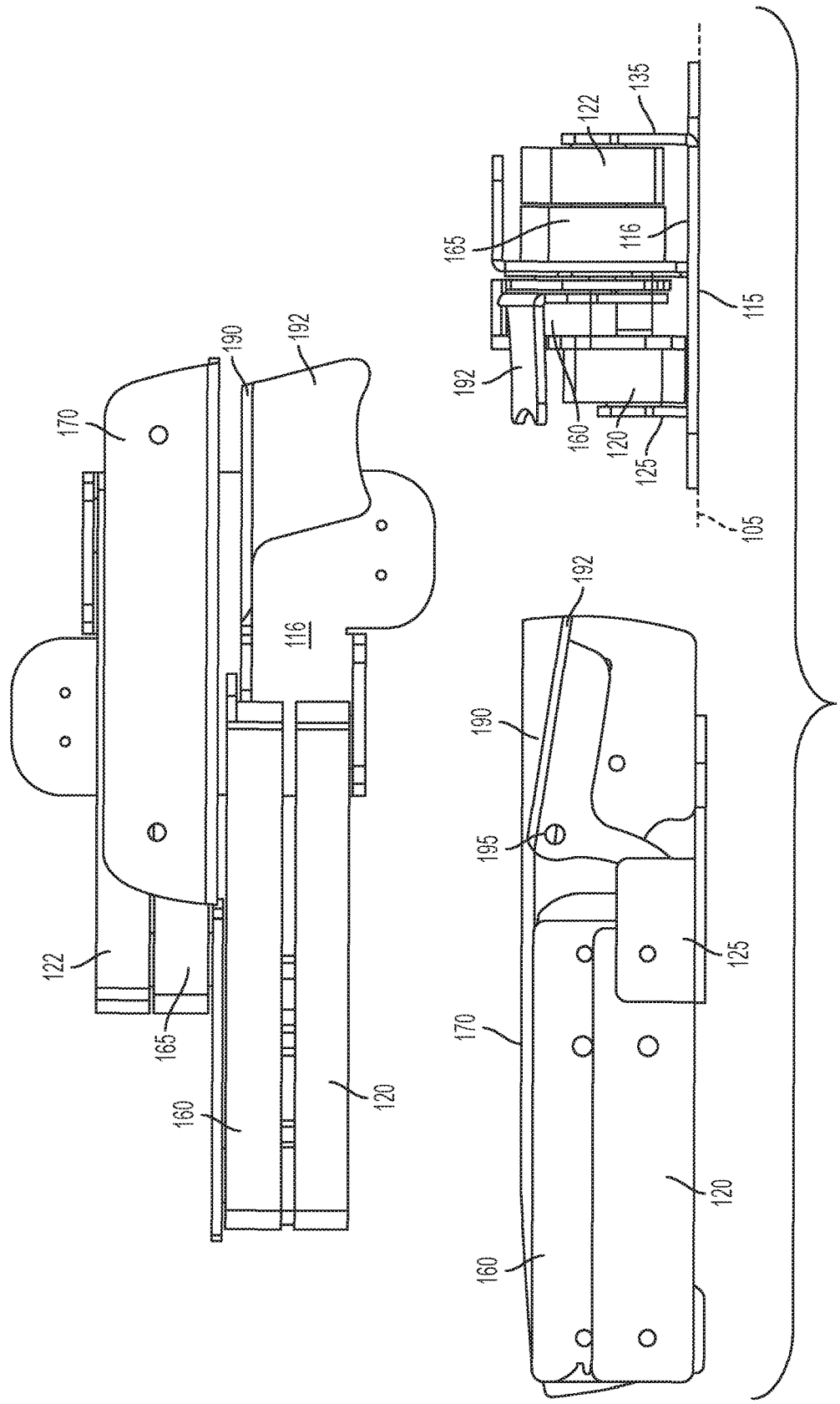
FIG. 4 is a diagram of multiple angles of an exemplary mechanism at an example collapsed configuration in accordance with an embodiment of the invention.

FIG. 4 is a diagram of multiple angles of the adjustable height mechanism 100 at an example collapsed configuration, including a top view, a side view, and a back view. The overall collapsed height of the adjustable height mechanism 100 is approximately equivalent to the depth of first lower upright bar 120, or the depth of first upper upright bar 160, or the depth of second upper upright bar 165, or the depth of second lower upright bar 122.

As each of first lower upright bar 120, first upper upright bar 160, second upper upright bar 165, and second lower upright bar 122 are not disposed in the same horizontal plane, each of first lower upright 120, first upper upright bar 160, second upper upright bar 165, and second lower upright bar 122 may lie directly flat against the topside lower bracket surface 116 and result in the lowest possible minimum vertical distance of the adjustable height mechanism 100 when in the example collapsed configuration.

The example adjustable height mechanism described herein may be implemented at any scale and for any purpose. For example, the example adjustable height mechanism may include a flat surface upon which a computer monitor or other electronic display device may be placed. The example adjustable height mechanism may then be placed upon an existing non-height-adjustable desk to add height adjustment. For example, when the example adjustable height mechanism is in a collapsed configuration, a user may sit and view the display device at eye level from a seated position. If the user would prefer to stand, the example adjustable height mechanism can be raised and locked into a preferred height, and the user may then stand and view the display device at eye level from a standing position.

In another example implementation, the example adjustable height mechanism may be disposed at a large scale and used to lift vehicles so the underside may be accessed. In another example, the example adjustable height mechanism may be disposed in a movable lift to raise workers on a platform to a vertical height to perform work such as construction, painting, or other tasks. In another example, the example height mechanism may be disposed as a movable lifting table for use in an industrial or factory environment to assist workers in lifting and transporting heavy materials.

The example adjustable height mechanism may be implemented using any configuration of suitable materials. For example, the example adjustable height mechanism may be implemented using wood, metal, plastic, composite materials such as carbon fiber, or the like. Any example component in the example adjustable height mechanism may be constructed using any suitable material without limitation.

Examples of the example adjustable height mechanism have been disclosed. Embodiments of the invention has been described in detail with regard to several example implementations but it is to be understood that these examples are presented for the purpose of illustrating the example adjustable height mechanism and are not intended to limit the disclosure in any way, and one of skill in the art appreciates that many other example implementations of the example adjustable height desk are possible. It is to be expected that as the materials from which the example adjustable height mechanism may be constructed change and develop over time that these materials may be used to implement the example adjustable height mechanism but that the spirit of this disclosure is not limited by these materials.

What is claimed is:

1. An adjustable height platform, comprising:
a lower bracket;
a first lower mounting pivot coupled to the lower bracket;
a first lower upright bar;
a connecting bracket, the connecting bracket including a first bracket mounting pivot and a second bracket mounting pivot;
a first upper upright bar;
an upper bracket;
a first upper mounting pivot coupled to the upper bracket; and
a height fixing mechanism coupled to the first upper upright bar, wherein:

a vertical offset of the first lower mounting pivot relative to the lower bracket is one half or less than one half of the distance between the first bracket mounting pivot and the second bracket mounting pivot; and a vertical offset of the first upper mounting pivot relative to the upper bracket is one half or less than one half of the distance between the first bracket mounting pivot and the second bracket mourning pivot.

2. The adjustable height platform of claim 1, wherein the connecting bracket includes a third bracket mounting pivot.

3. The adjustable height platform of claim 2, further comprising a second lower upright bar connected to the third bracket mounting pivot, and a second upper upright bar connected to the third bracket mounting pivot.

4. The adjustable height platform of claim 3, wherein the lower bracket includes a second lower mounting pivot and the second lower upright bar is coupled to the second lower mounting pivot.

5. The adjustable height platform of claim 3, wherein the upper bracket includes a second upper mounting pivot and the second upper upright bar is coupled to the second upper mounting pivot.

6. The adjustable height platform of claim 1, wherein the first lower upright bar and first upper upright bar are disposed in separate perpendicular planes.

7. The adjustable height platform of claim 1, further comprising a height fixing mechanism release to mate with the height fixing mechanism.

8. The adjustable height platform of claim 1, further comprising a first-to-second stage force transfer.

9. An adjustable height monitor platform, comprising:
a lower bracket;
a second lower bracket;
a first lower mounting pivot coupled to the lower bracket;
a second lower mounting pivot coupled to the second lower bracket;
a first lower upright bar coupled to the first lower mounting pivot;
a second lower upright bar coupled to the second lower mounting pivot;
a connecting bracket including a first bracket mounting pivot, a second bracket mounting pivot, and a third bracket mounting pivot, wherein the first lower upright bar is coupled to the first bracket mounting pivot, and the second lower upright bar is connected to the third bracket mounting pivot;
an upper platform;
a first upper mounting pivot coupled to the upper platform;
a second upper mounting pivot coupled to the upper platform;
a first upper upright bar coupled to the first upper mounting pivot and coupled to the second bracket mounting pivot;
a second upper upright bar coupled to the second upper mounting pivot and coupled to the third bracket mounting pivot;
a height fixing mechanism coupled to the first upper upright bar; and
a height fixing mechanism release coupled to the upper platform.

10. The adjustable height monitor platform of claim 9, further comprising a first-to-second stage three transfer coupled to the first lower upright bar and the first upper upright bar, wherein the first-to-second stage force transfer is a first gear coupled to the first lower upright bar and a second gear coupled to the first upper upright bar.

11. The adjustable height monitor platform of claim 9, wherein the height fixing mechanism and the height fixing mechanism release are disposed in a single mechanism.

12. The adjustable height monitor platform of claim 9, wherein the height fixing mechanism is a portion of a toothed gear and the height fixing mechanism release is a pinion that fits between a first tooth and a second tooth of the portion of the toothed gear.

13. The adjustable height monitor platform of claim 9, further comprising a flat surface coupled to the upper platform.

* * * * *